United States Patent [19]

Bradley

[11] Patent Number: 4,991,223

[45] Date of Patent: Feb. 5, 1991

[54] APPARATUS AND METHOD FOR RECOGNIZING IMAGE FEATURES USING COLOR ELEMENTS

[75] Inventor: William C. Bradley, San Diego, Calif.

[73] Assignee: American Innovision, Inc., San Diego, Calif.

[21] Appl. No.: 213,725

[22] Filed: Jun. 30, 1988

[51] Int. Cl.$^5$ .............................................. G06K 9/00
[52] U.S. Cl. .................................. 382/17; 358/21 R; 358/22; 358/31; 250/226
[58] Field of Search .......................... 250/226; 382/17; 358/22

[56] References Cited

U.S. PATENT DOCUMENTS

4,430,748  2/1984  Tuhro et al. ............................ 382/50
4,797,738  1/1989  Kashi et al. ............................ 382/17

Primary Examiner—David K. Moore
Assistant Examiner—Daniel Santos
Attorney, Agent, or Firm—Baker, Maxham, Jester & Meador

[57] ABSTRACT

The invention is an apparatus and method for tracking colors in image features by using color elements. A scan signal representing a scanned imaage with colored features is converted into color element signals representing instantaneous magnitude values of predetermined color elements. These values are compared against predetermined color element magnitude value combinations representing expected colors of features in the image. If the instantaneous magnitude values match a predetermined color element value combination, the corresponding color is correlated with a picture element of the scanned image. More elaborately, image features are recognized by comparing the matched combination with the expected image feature locations. When a set of instantaneous values matching one of the expected color element combinations is correlated with an expected location, a determination is made whether the color element combination is one expected for the particular feature location. It is expected that each image feature will be substantially invariant chromatically. Thus, once the edge of a feature is detected by detection of a predetermined color element combination, the picture elements between that edge and the following edge of the feature are assumed to have the same value.

13 Claims, 3 Drawing Sheets

APPARATUS AND METHOD FOR RECOGNIZING IMAGE FEATURES USING COLOR ELEMENTS

BACKGROUND OF THE INVENTION

The invention is in the field of image systems, and is particularly relevant to the field of image feature identification.

In the field of image processing, the term "scanning" refers to the rendering of an image into a string of individual picture elements (pixels), each corresponding to an elemental portion of the image and representing the instantaneous value of an optical attribute of the image at that point. In black and white television, light intensity is the attribute represented by a pixel. In digitized monochromatic imaging systems, a pixel is a multi-bit, digital representation of light intensity. The succession of pixels representing the serialization of an image typically is provided in a standard format composed of lines, fields, and frames.

In color imaging systems, a pixel represents not only the intensity of light at the corresponding point of an image, but also other chromaticity attributes which, when combined with intensity, represent the color of the image point. Scanned color imaging systems are well known in the art, as are a variety of formats for signals representing the chromaticity of image picture elements. Two of the best known standard scanned color image representations are the NTSC and RGB standards.

These standards are based upon one or more representations of color space. When used herein, the term "color space" refers to any one of a number of three-dimensional representations of all of the possible combinations of three predetermined color attributes. These three attributes are referred to hereinafter as "color elements". One set of color elements, for example, includes hue, saturation, and intensity.

Monochromatic (black and white) imaging systems which operate to identify features contained in an image are relatively slow and expensive when compared to the tasks they must perform. Essentially, no single pixel in a monochromatic image is, alone, identifiable as belonging to a particular feature of the image. This is because, with changes in illumination or with shadows, any point on a feature could potentially appear as any brightness to an imager (camera) regardless of the feature's intrinsic color. Typically, a monochromatic imaging system identifies an image feature by detecting the edges of the feature, algorithmically connecting the feature's edges, and then using information representing the connected edges to reconstruct the size and shape of the feature in the image.

Figure 1:
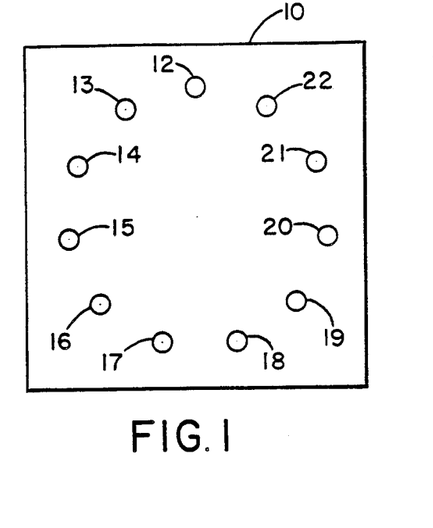
FIG. 1 is a representation of a pill container having a plurality of colored pills arranged in a sequence, and which is illustrative of an image with colored features.

In the typical industrial application, a robot system may employ a vision system of which an imaging system is a component. In this regard, a "vision" system is one which enables a robot mechanism to observe an image and to correlate it with a paradigm image, in order to conduct industrial processing of workpieces which come periodically into the vision system's field of view. For example, FIG. 1 represents a workpiece 10 comprising a flat, recessed container for an array of color-coded pills 12-22. The pills 12-22 form a cycle of birth control pills which are meant to be taken in a predetermined sequence. Each pill's position in the sequence is indicated by a particular color. An assembly line which produces packages such as the container 10 will, at some point, inspect each pill package to determine whether the pills have been placed in it in the proper sequence. A vision system employed for this purpose will compare each pill carrier with an exemplary image of a carrier having pills in the proper sequence.

A monochromatic image system would have to enhance and locate the edges of the pills 12-22 of each carrier coming into the view of the vision system, would have to use the edge information to reconstruct the size and shape of the pills in the carrier, and then would compare the size and shape data with the stored exemplary image of a pill carrier to identify the features (the pills) and their locations. This type of image correlation is costly and systems which perform it in a reasonable time are, necessarily, expensive.

When black and white information is insufficient to achieve the desired results, as in the example where the pills must be differentiated on the basis of their colors, additional color information represents a substantial increase in the bandwidth of a vision system.

SUMMARY OF THE INVENTION

The invention is based upon the critical observation that, if the image features which are to be identified and located differ even subtly in color, then color can be used for determining when any particular pixel is to be identified as a component of a given feature. The essence of this invention is a mechanism and method for evaluating a scanned video image to determine, on a pixel-by-pixel basis, whether a given pixel is a member of one of a number of image features which are to be recognized and tracked. To make the system robust against changes in illumination and shadows, features are recognized on the basis of color aspects which do not vary with illumination.

From one aspect, the invention is seen as an improvement to a system which converts an image into a video signal by a predetermined scanning procedure, the image containing colored features, the system producing a scan signal representing the product of the scanning procedure. The improvement is one for identifying the features based upon their colors, and the improvement includes a color element converter for converting the scanned signal into a plurality of conversion signals, each conversion signal corresponding to a predetermined color element having a continuous extent in color space, each conversion signal having a magnitude representing a value of the corresponding color element. A value range circuit is connected to the color element converter to receive the conversion signals for comparing the magnitude of each conversion signal against a plurality of predetermined value ranges of the color element corresponding to the conversion signal, and for providing a value range signal indicating a value range containing the value represented by the magnitude of the conversion signal. The improvement includes a provision for storing a representation of feature locations in the image, and also has a circuit which is connected to the image storage provision and to the value range circuit for combining the value range signals produced by the value range circuit with the image representation to produce a feature location signal representing an edge of a feature occupying a feature location and having a color including two color element values, each color value element contained in one of the respective predetermined value ranges.

From another aspect, the invention is a method for recognizing colored features occupying feature locations in a scanned image, which includes providing a scan signal derived by scanning the image according to a predetermined procedure, the scan signal including a sequence of image elements representing said image. Predetermined feature colors are represented by color element value sets, each of the color element value sets including a respective value for each of two orthogonal color elements. The scan signal is converted into a plurality of color element representations and these representations are compared with the color element value sets. In the event of a match between the color element representations and one of the color element value sets, the color element representation is compared with feature locations in the image. Finally, if there is a correlation between these color element representations and a feature location, the represented feature color is assigned to all image elements at the feature location.

In its most basic form, the invention is a color tracking apparatus which operates on a video signal consisting of a picture element sequence representing the product of scanning an image with colored features. The apparatus tracks the features based upon their colors and includes a color element converter which converts each picture element into a plurality of conversion signals, each conversion signal corresponding to a predetermined color element and having a magnitude representing a value of that color element. A plurality of value range devices are connected to the color element converter, each to receive a respective conversion signal. Each value range device activates a value range signal when the magnitude of its respective conversion signal falls in a particular value range of the color element represented by that conversion signal. A plurality of combining elements are connected to the value range devices. Each combining element is connected to all of the value range devices to receive a respective value range signal from each of the value range devices. Each combining element generates a color signal in response to activation of all of the respective value range signals which it receives. A comparator circuit is connected to the combining elements to compare the color signals generated for successive picture elements and to produce a condition signal indicating the result of that comparison. A tracker is connected to the comparator circuit for indicating where in the scanned image the condition signal indicates a color disparity between successive picture elements.

In an image presenting colored features against a uniform background, feature edge locations can be recognized by detecting a change in color in a scan line between background and non-background colors. As is known, the color elements of hue and saturation (or R-Y and B-Y) for an object or an image portion are substantially invariant in the face of intensity variations. Consequently, by use of the inventions, the processing required in prior art intensity-based edge detection to account for shadowing and changes in illumination is eliminated.

It is accordingly a primary object of this invention to solve the problems of edge detection and feature recognition in imaging systems by basing feature recognition only upon changes in feature color.

It will become evident that the invention achieves this object and provides other significant advantages when its detailed description is read with reference to the below-described drawings.

DETAILED DESCRIPTION OF THE INVENTION

Vision systems presently perform image processing functions based upon image information contained in feature intensity. Traditionally, whenever such systems have been expanded to include information relative to color, the total information processing capacity of these systems has had to grow substantially. Consequently, improvements to vision systems have tended to concentrate on development of algorithms for edge definition and component labeling using intensity variations. Such algorithms require the allocation of substantial processing resources and processing time to perform their functions. This invention reduces the edge processing requirement by recognizing that the edge of a feature can be simply detected by observing when a transition between the feature's color and the image background occurs. Such a change can be detected easily by tracking the color elements of hue and saturation as the image is scanned. Since hue and saturation are invariant with changes in illumination, the uncertainty of edge definition based upon intensity variation is eliminated.

Thus, in FIG. 1, with the scanning of the pill container 10, a prior art intensity-based imaging system would process the pixels produced by scanning the image of the pill carrier, looking for a change in the magnitude of pixel intensity. When intensity changes exceeding a predetermined threshold are detected, the imaging system marks the pixel where the change occurs as a portion of the edge of one of the pills. In processing the scanned representation of the pill container image, an algorithm is provided for associating (connecting) adjacent edge pixels to form a continuous closed feature edge. Further, the algorithm labels non-edge pixels with reference to the edges. Thus, for example, the pixels contained within the edge defining the pill 12 will be assigned a common label to distinguish them from the pixels which represent the pill container and those representing the other pills 13-22.

In the invention, the pill container 10 is scanned to produce a signal including not only intensity information, but also information relating to non-intensity color elements. Prior art imagers such as vidicon cameras are known which provide image representations in the form of scan signals containing color information. For example, NTSC and RGB cameras provide scan signals having predetermined formats which include all of the information necessary to derive the colors of image features.

Figure 2:
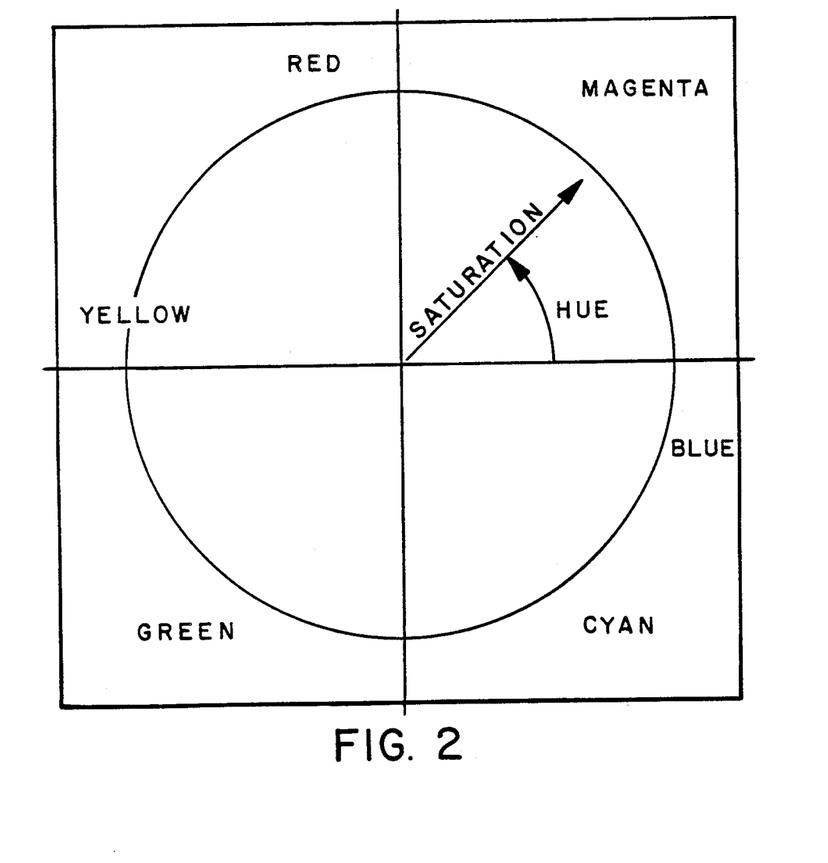
FIG. 2 is an illustration of a color chart representative of three-dimensional color space defined by three mutually perpendicular color element axes.

As is known, the attribute of color can be represented quantitatively in a three-dimensional "color space" defined by three mutually perpendicular axes. Each color space axis has a continuous extent and represent a continuum of values for the element. For one understanding of the invention, these three elements can be hue, saturation, and intensity. For an explanation of color space based upon these three elements see "Precise Color Communication" published by the Minolta Camera Company Ltd., Asaka, Japan. FIG. 2 illustrates a plane in such a color space, which is perpendicular to the intensity axis. In the plane, saturation and hue are illustrated in polar form. Any color can be represented by a set of color element values. Each color element value represents a respective magnitude of one of the elements of hue and saturation. It should be evident that any color element value set can also be represented in a cartesian coordinate system. A well-known cartesian representation of color is the Y, R-Y, B-Y system.

Returning to FIG. 1, the inventors have realized that the respective features (such as pills) in the pill container image illustrated in FIG. 1 can be reliably and easily identified by detection of changes of color in the scanning signal representing the image of the pill container. Thus, in the pixels forming a scan line intersecting the pill 12, the edge of the pill can be distinguished from the pill container by distinguishing the pill's color from the color of the pill container 10. The detection of the color change in the invention is based upon observing the instantaneous pixel values of any two intensity-independent color elements.

Further to an understanding of the invention, in a pill production system where a robot is stationed to perform quality inspection of products as they come off an assembly line, one of the quality checks on each pill container would be detecting the presence of a pill at each pill location. Further, if the pills are different colors and are arranged in a predetermined color sequence, the quality check would include confirming the sequence. To support the imaging system labeling of image components, a reference image is used to indicate pill locations, and further to provide information respecting the color of a respective pill at a particular location. The invention supports this process by establishing a set of feature colors representing the colors expected for features in the reference image. The expected colors are provided in the form of color element value range sets. A colored image is provided to the invention in the form a scan signal including color information relating to the image. The scan signal is converted, pixel-by-pixel, into color element representations of the image by conversion of the scan signal. For each pixel, the color element representations form a color element magnitude set which is compared against the value sets defining the expected colors. When a match is found, a comparison is made between the location of the matched pixel and the pill locations in the reference image. If the pixel is at a feature location, the invention saves its color element values, together with the location.

Figure 3:
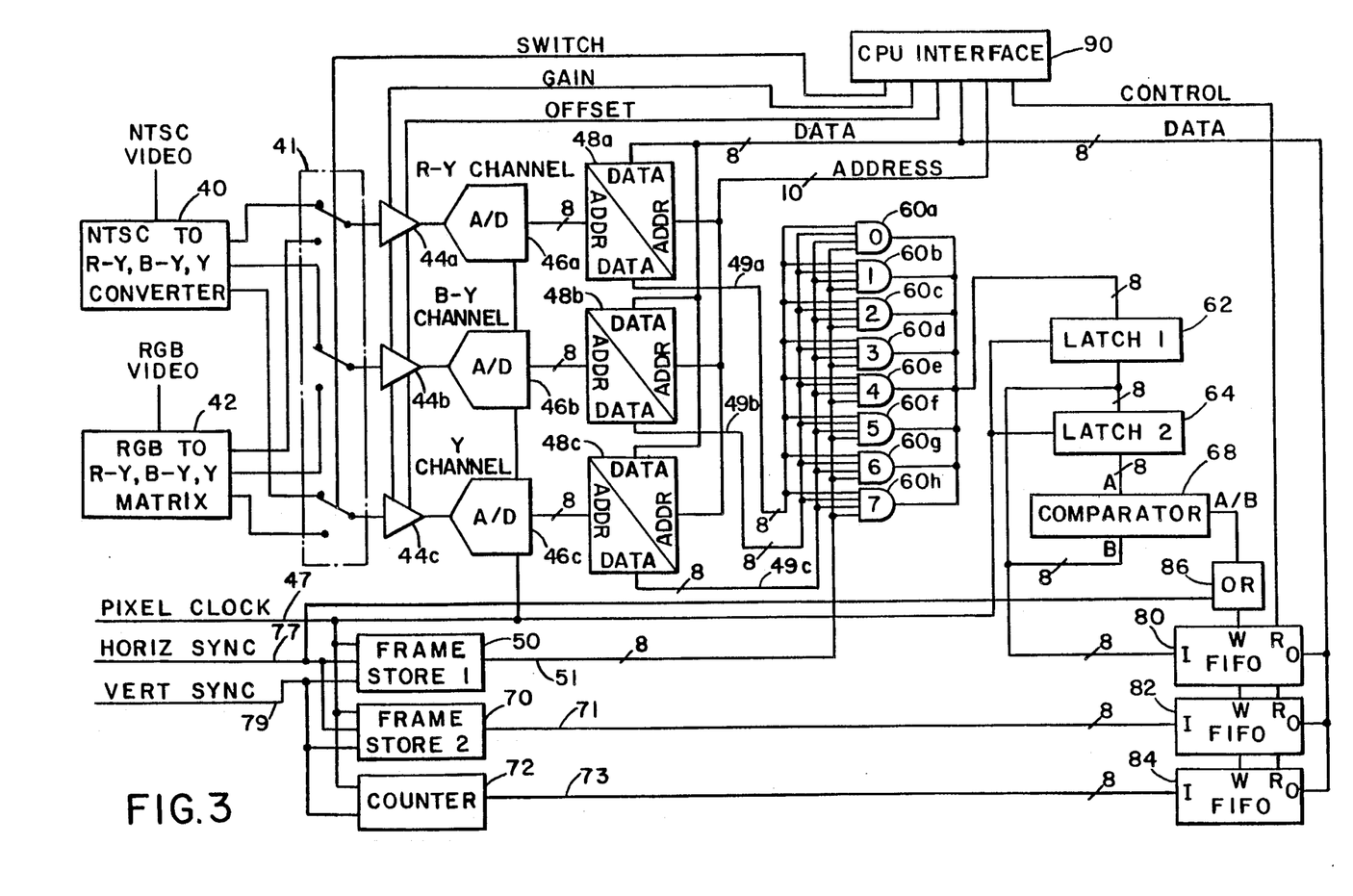
FIG. 3 is a circuit diagram illustrating the apparatus of the invention.

The invention is practiced in the apparatus illustrated in FIG. 3, which responds to a scan signal representing the product of a procedure for scanning an image. The scan signal can be a standard format NTSC or RGB video signal, for example, either of which can be converted by known methods to a color space coordinate system for representing the chromatic information in the signal by three values, each corresponding to a color element axis in the preferred color space. In this regard, a typical cartesian coordinate system is the Y, R-Y, B-Y system used in the video industry. In this system Y is the luminosity, or brightness, while the R-Y and B-Y signals each carry color information which is independent of luminance. This system of color representation is based upon the well-known CIE chromaticity chart. Relatedly, this system of representation can, by a simple transformation, be converted into a cartesian coordinate system in which the color elements are hue, saturation, and luminosity. In either case, two of the color elements (hue and saturation, or R-Y and B-Y) remain invariant with changes in illumination of an object, which will change the magnitude of the Y signal in the pixels composing the image.

Conversion of the standard format video signals is performed by a converter 40 (for NTSC video) or 42 (for RGB video). Each of the converters 40 and 42 therefore produces three signals, R-Y, B-Y, and Y. A switch 41 selects the three signals output by one of the converters 40 and 42, and feeds each of the three selected signals to a respective conversion channel including an amplifier and an analog-to-digital (A/D) converter. The R-Y channel includes the amplifier 44a which feeds the R-Y signal from the selected converter to the A/D converter 46a. Similarly, the B-Y channel includes the amplifier 44b feeding the B-Y signal to the A/D converter 46b. Last, the Y (luminance) channel consists of the amplifier 44c feeding the luminance signal to the A/D converter 46c. Each of the converters 46a-46c converts its respective signal into an 8 bit conversion signal whose digital value represents the magnitude of the respective converted signal for the present pixel. (For convenience, the conversion signals are also referred to as "pixels", or "converted pixels".) Synchronization of the A/D operations with the pixel rate of the scan signal is provided by a PIXEL CLOCK signal present on signal line 47, which is fed to each of the converters 46a-46c. The PIXEL CLOCK signal is derived by conventional means (not shown) from the scan signal and represents the fundamental pixel frequency of the scanned image. The outputs of the A/D converters 46a-46c are updated at the pixel rate.

Figure 4:
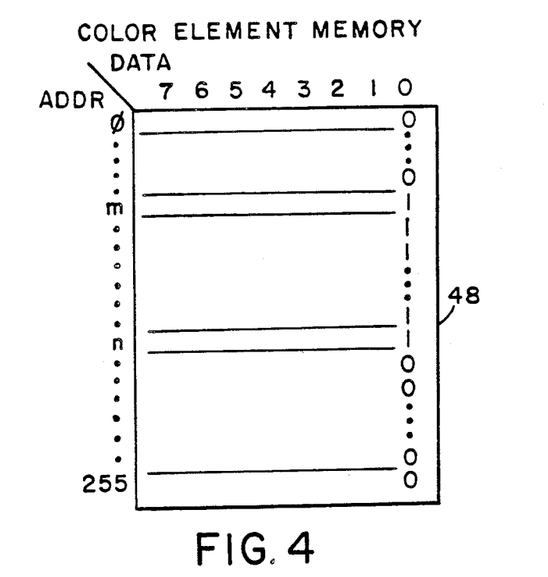
FIG. 4 is a memory map illustrating a color element memory in the circuit of FIG. 3.

The output of each of the A/D converters 46a-46c is fed to the address port of a respective one of three color element memories 48a-48c. The contents of the color element memories are preset in a manner described below to patterns which correspond to predetermined color element value ranges. A color element value range can be understood with reference to FIG. 4, which shows a map of a color element memory 48. The color element memory 48 is conventional in all respects in that it has addressable locations 0-255, each location containing eight bits (one byte) of data. Conventionally, the data bits are numbered from 0 through 7 in order of increasing significance (that is, bit 7 being the most, and bit 0 the least, significant bit). As shown in FIG. 4, a string of ones is placed in the least significant bit positions of addressable locations m-n. Thus, for any conversion signal having a color element value magnitude contained in the range from m through n, the color element memory will read out a byte of data with a one in the last significant position. Manifestly, the string of least significant bit ones defines a color element value range from m through n. It should be evident that eight color element value ranges can be placed in the color element memory by the method described above, one for each memory data bit position. Further, a set of eight value ranges can be provided for each of the color elements represented by the output of the A/D converters 46a-46c. With this, it should be evident that a color element value range can include from 1 to 256 values. Of course a value set with one member defines a point on a color element axis, while a set of 256 values defines essentially an entire color element axis.

Returning to FIG. 3, each of the color element memories 48a–48c provides, for each pixel, an output comprising eight parallel bits of data. These outputs are represented by the signal lines 49a–49c, which are fed to an array of eight conventional AND gates 60a–60h (which are also denoted as gates 0–7, respectively). Each of the AND gates receive as an input one bit from each of the color memories 48a–48c on a respective one of the signal lines 49a–49c. The bits provided from the color element memories to any one AND gate are of equal significance. Thus, AND gate 0 receives each color element memory's low-order bit. With nothing more, each of the AND gates 60a–60h is able to detect and identify a predetermined feature color by concurrency of the three color element memory data bits. For example, if the current pixel has magnitude for the R-Y, B-Y, and Y color elements that lie within respective value ranges for those elements which are entered into the zero bit positions of the color element memories, the output of AND gate 0 which collects those color element memory bits will rise (assuming positive logic).

As an example, consider the case where the low-order bit is set to a 1 at address locations 100–150 of memory 48a, locations 45–85 of memory 48b, and locations 210–225 of memory 48c. As explained above, the least significant bits of memories 48a–48c are connected to AND gate 0 (indicated by reference numeral 60a). Now assume that conversion of the current pixel by the A/D converters 46a–46c results in values of 111 for the R-Y channel, 47 for the B-Y channel, and 224 for the Y channel. Each color element magnitude value lies within a color element value range corresponding to one of the lower-bit address ranges for the memories 48a–48c. In this case, the output of AND gate 60a will rise. This positive conditioning of the output of the AND gate indicates that the color of the current pixel corresponds to a predetermined feature color. The predetermined feature color is defined by a cubic section whose location and dimensions in color space are given by the address ranges for the low-order bit patterns in the color element memories 48a–48c. Viewed from another aspect, an expected color feature is given by a set of color element value ranges, each value range being stored in a string of ones in a particular bit position in its respective color element memory, and the color element memory bit positions of all value ranges of the set being identical.

It will be appreciated that each of the AND gates acts as a comparator which checks the value of the current pixel against a particular feature color, and provides a signal indicating whether or not the pixel color is within the cubic section of color space associated with the gate. In a sense, the AND gates "recognize" feature colors which are within the color space sections. One will appreciate that the color element memories can be programmed to flexibly define the expected feature colors. Thus, a feature color can be defined by a point in color space, a two-dimensional plane, or a cubic section. Of course, expanding the number of points defining a feature color range provides a tolerance for magnitude variations which may result from variables in the production process or imaging procedures.

Each of the AND gates 60a–60h also receives as an input one bit of an 8-bit mask provided by a frame store 50. The frame store 50 is conventional in all respects and can include, for example, an apparatus for storing a multi-pixel representation of an image frame in a form which can be accessed at the same rate as that at which pixels are converted and fed to the color element memories. In this regard, the frame store 50 is synchronized by the pixel clock to the operations of the color element memories 48a–48c, and therefore presents its 8-bit mask to the AND gates in synchronism with the bits from the color element memories 48a–48c. The image stored in the frame store 50 is a representation of the expected image which is being processed. The image in the frame store 50 contains feature locations where features in the stored image are located. Since the stored image is scanned in synchronism with the image being observed by the vision system of which the invention forms apart, the frame store image provides a means for correlating feature locations in the scanned image with their expected locations in the stored image. In effect, the frame store 50 provides, for each pixel presented to the color element memories, an 8-bit mask, which is combined into the AND gates 60a–60h. Thus, each bit plane in the frame store 50 constitutes a mask which defines the area within which one of the color ranges is detectable. For example, if, over some part of the image field, the frame store 50 contains zeros in its low order bit, then, without regard to what the three color element memories provide, the output of the AND gate 60a will be inhibited, and, therefore, the color programmed into the low order bit in the memories cannot be recognized by the system in the feature location so defined. Thus, if it is necessary to mask off some area into which the expected features cannot or should not move, and which might contain some color which can be confused with the color of one of the tracked features, recognition of the feature based upon its color will be prevented by masking the bits which define the color at the gate where the feature color is recognized. The provision of eight bits from the frame store 50 supports an independently changeable mask for each of the feature colors which the system expects to recognize.

In FIG. 3, the outputs of the AND gates 60a–60h are fed, in sequence, to conventional clocked latches 62 and 64. These outputs form a byte, referred to below as an "encoded pixel". The latches 62 and 64 are enabled by the PIXEL CLOCK signal on line 47, and therefore operate in synchronism with the rate at which pixels are presented to the color element memories. Thus, the response of the AND gates is output by the latch 62 for the present pixel, while the AND gate output configuration for the pixel immediately preceding the present one is available at the output of the latch 64. The AND gate output configurations for the adjacent previous pixels are compared in a comparator 68 which receives and compares the outputs of the latches 62 and 64. It will be appreciated that the bit pattern represented by the outputs of the AND gates will change only when the color of the current pixel differs from that of the preceding one, and the color occurs at a pixel location which is not masked by an output of the frame store 50. Thus, the comparator 68 can be said to provide a feature location signal which changes only in response to a pixel representing an edge of a feature occupying a feature location defined by the frame store 50 and having a color including color element values, each of which is contained in a respective predetermined value range.

The feature location signal produced by the comparator 68 is used to operate a line encoder. The encoder includes a second frame store circuit 70, a pixel counter 72, and three conventional FIFO (first-in-first-out) circuits 80, 82, and 84. Synchronization of the line encoder with the image currently being scanned is provided by horizontal and vertical synchronization signals (HORIZ SYNC and VERT SYNC, respectively) provided on signal lines 77 and 79. In addition, the PIXEL CLOCK on signal line 47 is provided to the frame stores 50 and 70, and to the counter 72. The PIXEL CLOCK, HORIZ SYNC and VERT SYNC signals are conventionally derived from the current scan signal by a means which is not shown. As is known, the horizontal synchronization signal on signal line 77 defines the beginning of each scan line, while the vertical synchronization signal on signal line 79 indicates beginning of a frame. These two signals, together with the pixel clock, are used to address the images in the frame stores 50 and 70 so that the images in those stores are read out in lock step with the scanning of the current image being processed. In addition, the pixel clock increments the counter 72 with the occurrence of each pixel, while the vertical synchronization signal resets the counter 72 at the beginning of each frame.

The FIFOs 80, 82, and 84 are conventional in all respects. Each FIFO constitutes a byte-wide queue having an input (I) port, an output (0) port, a write control (W) port, and a read control (R) port. Each time a transition of a predetermined polarity is presented to the write control of a FIFO, the current byte of data present at the input port will be entered into the FIFO queue. Each time a control signal transition is presented to the read control port, the oldest byte in the queue is removed from the queue and provided through the output port.

The FIFO 80 receives as input, the current encoded pixel provided from the AND gates 60a-60h, by way of the latch 62, while the FIFO 84 receives the current pixel count from the counter 72. The FIFO 82 receives a byte from the frame store 70. Thus, each time the output of the comparator 68 transitions, indicating two adjacent pixels with dissimilar colors, a byte will be entered into each of the FIFO 80, 82, and 84. With the preceding description, it should be manifest that the comparator output will transition whenever there is a transition in pixel color as would occur as a result of a transition from image background to a feature, from the feature to background, or from one feature to another. Upon each transition, the FIFOs 80, 82, and 84 will add to the FIFO queue the present encoded pixel of a new feature, the pixel position (which corresponds directly to the current value of the counter 72) and, optionally, a byte from the second frame store 70. Preferably, the second frame store contains a representation of the expected image which labels regions of the image. The function of the labels is to permit identification not only of a detected feature, but whether the feature is in a labeled region. By predefining regions in the second frame store 70, decisions regarding whether a feature is in a correct position can be simplified.

An additional element in the form of an OR circuit 86 is provided to gate the horizontal synchronization signal or the output of the comparator 68 to the write control ports of the FIFOs 80, 82, and 84. This provides for identifying the end of a scan line, which can assist processing of the FIFO queues.

A control interface in the form of a -computation and processing unit (CPU) 90 orchestrates the operations of the elements described thus far. In this regard, the CPU 90 is a programmable device, which can be conventionally configured to provide switch setting controls to the switch 41 for selection of an appropriate scan signal, and gain and offset settings to the amplifiers 44a-44c. The most important functions of the CPU 90 are the programming control of the color element memories 48a-48b, and 48c, and the extraction and processing of line-encoded data from the FIFO 80, 82, and 84. In the first regard, the preferred embodiment of FIG. 3 shows the memories 48a-48c as being dual-ported mechanisms, with the CPU 90 connected to one set of ports, and the other set of ports connected as described above. This arrangement permits for reprogramming of the predetermined color value ranges in the color element memories through the CPU 90. With respect to the reading function, the CPU 90 provides a CONTROL signal to the read control ports of the FIFO 80, 82, and 84, and intakes and processes the align-encoded data which they contain. The CPU 90 is conventionally programmed to perform component labeling of image pixels based upon the color difference information stored in the FIFOs. Preferably, a known component labeling procedure is employed to interpret adjacent encoded pixels as edges of a feature and to assign the color of the leading edge pixel to all of the pixels in the feature location portion of the current scan line lying between the edges.

With this description, it will be evident that the use of color element memories in combination with the AND gates compresses the 24-bit wide signal presented to the color element memories, which contains all the detail of a video image to the 8-bit wide signal output by the AND gates 60a-60h, or, more properly, eight 1-bit wide signals, each of which is zero when the feature color recognized by the respective channel is not present, and one when the feature color is present.

Although FIFOs are used in known line encoding techniques, such mechanisms are normally not used in current machine vision systems which process colored images. The reason line encoders are not normally used in color machine vision systems is that each pixel has $2^{24}$ possible colors. Resultantly, even a in scene with insubstantial chromatic variation, the chances of any significant number of adjacent pixels being exactly the same color are very remote. Thus, line encoding by queuing in response to a change in pixel color does not appreciably reduce image processing bandwidth. However, in the system of the invention, there are $2^{24}$ possible colors entering the color element memories; but only 8 possible outputs leaving the memories. Therefore, long stretches of a scanned image up to and including entire lines will result in the AND gates producing a byte having a value of zero. When a scan line does cross a feature within the range of colors that constitute the definition of a feature color, there will be an entry into the queue into the line encoder for any pixel that is within the feature color range only at the edges of the feature. In this situation, the line encoder enormously reduces the bandwidth of image information which must be presented to the CPU 90 in order to define feature edges and label image components.

Figure 5:
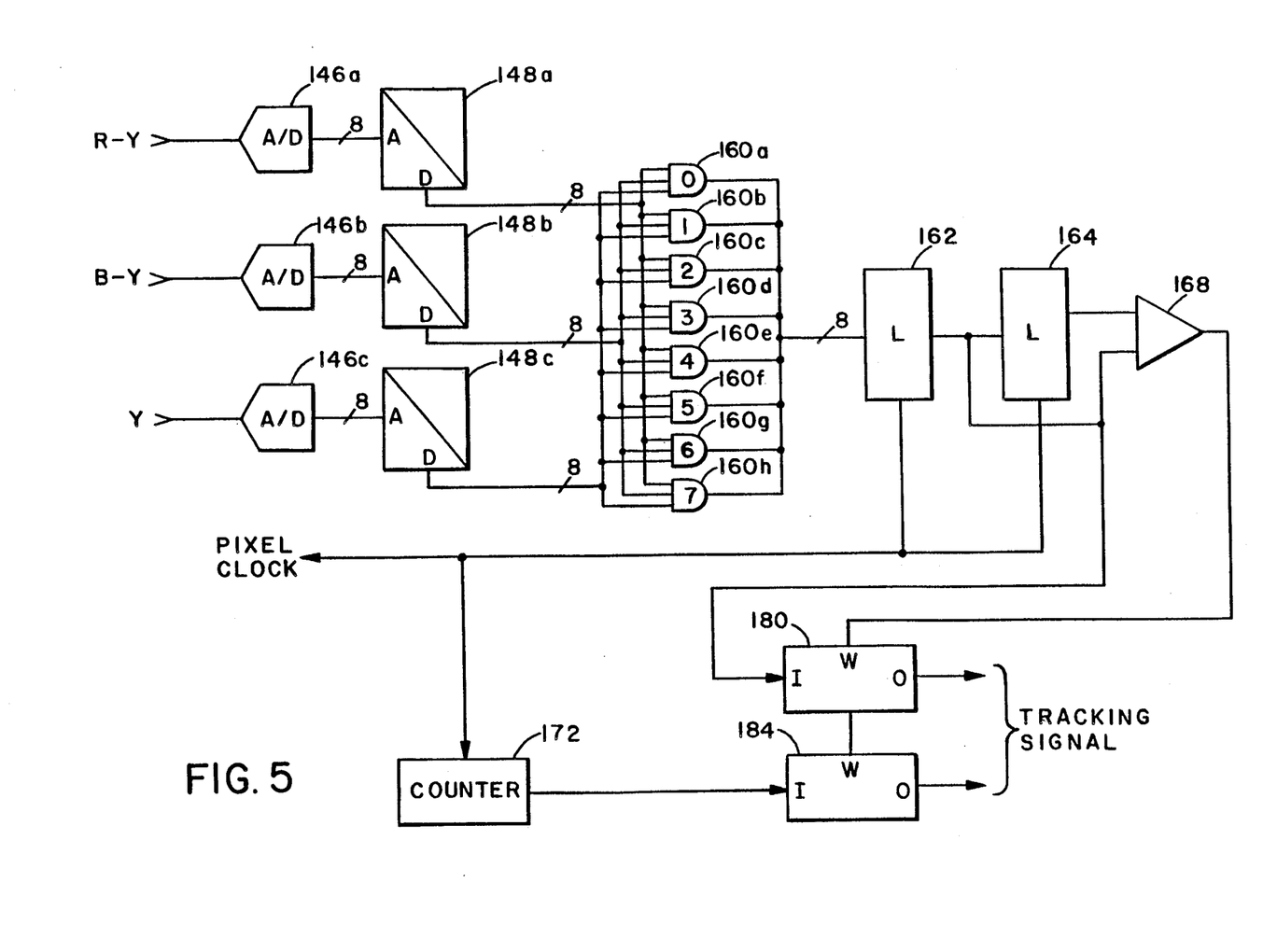
FIG. 5 is a circuit diagram illustrating a color tracking portion of the FIG. 3 circuit.

Refer now to FIG. 5, which illustrates a color tracker that includes elements of the apparatus illustrated in FIG. 3. In FIG. 5, it is assumed that conversion signals of the type produced by the converter 146a-146c in FIG. 3 are provided to the three color memories 148a-148c. In this regard, each memory receives at its output address (A) port an 8-bit representation of the magnitude of the predetermined color element contained in the current pixel being processed. The memories 148a–148c are programmed as described above, and provide at their output data (D) ports an 8-bit representation of information stored at the storage location addressed by a color element magnitude of the current pixel.

The AND gates 160a–160h each receive one bit of a currently-addressed storage location from each of the color memories. Each bit provided to an AND gate is of equal significance with the other two other bits provided to the gate. The significance of the color memory bits received by each AND gate corresponds to the numeral within the AND gate. Thus, for example, AND gate 160e receives three bits, each being bit 4 from one of the color memories 148a–148c.

The eight AND gate outputs are provided in parallel to the series-connected latches 162 and 164. The latches 162 and 164 are operated in synchronism with the scanning procedure which develops the pixels that are converted and fed to the color tracker of FIG. 5. This is signified by the provision of the PIXEL CLOCK signal to those latches. The outputs of the latches 612 and 164 are fed to a conventional digital comparator 168. When the colors of the two successive pixels stored in latches 162 and 164 differ, the output of comparator 168 will transition, causing the data available at the input (I) port of two conventional FIFO's 180 and 184 to be entered into the FIFO's. The FIFO 180 receives the output of latch 162, while the FIFO 184 receives the current count of a conventional digital counter 172 which counts up at the PIXEL CLOCK rate.

As thus described, the color tracker is operable in a system which converts an image, such as the pill package image of FIG. 1, into a video signal by a scanning procedure. Implicit in the scanning procedure is a scanning format, such as the commonly-understood NTSC standard video format including lines, fields, and frames. It is assumed that the format is further subdivided into pixels, each pixel having a predetermined location in the scanning format. Assuming that the counter 172 is reset by a vertical sync signal at the beginning of each scanning frame, the counter will increment through a counting sequence in response to the PIXEL CLOCK. The position of any pixel in the frame corresponds precisely with a unique value in the counting sequence conducted by the counter 172.

With this foundation, the operation of the color tracker of FIG. 5 begins with the provision of color element magnitude values in analogue form to the converters 146a–146c, the conversion of those values to digital form, and the provision of value range signals from the color element memories 148a–148c. The AND gates 160a–160h compress the outputs of the color memories 148a–148c into an 8-bit representation of the color of the current pixel. The 8-bit representation indicates which of 8 predetermined color ranges contain the color of the current pixel. If the color of the current pixel is not in any of the predetermined ranges, the value of the 8-bit word produced by the AND gates is 0. It should be noted that the AND gate array of FIG. 5 differs from that of FIG. 3 by the elimination of a fourth, masking bit. In this regard, there is no frame store for masking colors at predetermined image locations. Continuing with the description of operation, the 8-bit representation of the current pixel is available from the output of the latch 162 concurrently with the 8-bit representation of the previous pixel, which is available from the output of the latch 164. A tracking signal is developed by entering the 8-bit representation of the color of the current pixel into the FIFO 180 whenever its color differs from the color the preceeding pixel. Simultaneously, the current value of the counter 172 is entered into the FIFO 184. Thus, as a line of a video image frame is scanned, image feature colors in the line are tracked by entering into the FIFO's 180 and 184 the value of the color and the point in the line where change to the color occurred.

It will be evident to those skilled in the art that the color tracking apparatus of FIG. 5 differs from the apparatus of FIG. 3, chiefly in elimination of two frame stores (FS1 and FS2) and one FIFO. In other respects, the operation of the color tracker of FIG. 4 corresponds with the operation of the feature color identifier of FIG. 3.

I claim:

1. In a system which converts an image into a video signal by a predetermined scanning procedure, said image including colored features, said system producing a scan signal representing the product of said scanning, an improvement for identifying said features based upon their colors, the improvement comprising:

a color element converter for converting said scan signal into a plurality of conversion signals, two of said conversion signals corresponding to predetermined intensity-free color elements in color space, each of said conversion signals having a magnitude representing a value of the corresponding predetermined color element;

a value range circuit connected to said color element converter to receive said conversion signals for comparing the magnitude of each conversion signal against a plurality of predetermined value ranges of the color element corresponding to the conversion signal, and for providing a value range signal indicating a value range which contains the magnitude of said conversion signal;

color location means for storing a representation of a plurality of color locations in said image; and a correlation circuit connected to said color location means and to said value range circuit for combining the value range signals produced by said value range circuit with said representation to produce a color location signal representing an edge of a feature occupying a color location and having a color including said two intensity-free color elements.

2. In a system which converts an image into a video signal by a predetermined scanning procedure based upon a scanning format, said image including colored features, said system producing a picture element sequence representing the product of said scanning, an apparatus for tracking the colors of said features, the apparatus comprising:

a color element converter for converting a picture element into a plurality of conversion signals, each conversion signal corresponding to a predetermined color element and having a magnitude representing a value of said color element;

a plurality of value range devices, each value range device connected to said color element converter to receive a respective conversion signal, each value range device for activating a value range signal when the magnitude of its respective conversion signal is within a predetermined value range of the color element represented by said respective conversion signal;

a plurality of combining elements, each combining element connected to all of said value range devices to receive a respective value range signal from each of said value range devices, each combining element for generating a color signal conditioned in response to activation of all of the respective value range signals received by the combining element;

a comparison means connected to said plurality of combining elements for comparing the color signals generated for successive picture elements and for producing a condition signal indicating the result of said comparing; and line tracking means connected to said comparison means for indicating where in said scanning format said condition signal indicates a color disparity between successive picture elements.

3. The apparatus of claim 2 wherein each of said value range devices includes a color memory having an address port connected to said color element converter for receiving a respective one of said conversion signals, a plurality of addressable multi-bit storage locations, a first storage location of said multi-bit storage locations having an address corresponding to a first magnitude of the represented intensity-free color element in a first combination of color element magnitudes, said first storage location containing information including a bit of predetermined significance which represents said first magnitude, and a data port for providing said information.

4. The apparatus of claim 2 wherein said comparison means includes:

a first latch connected to said plurality of combining elements for receiving and outputting first color signals provided by said plurality of combining elements for a first picture element;

a second latch connected to said first latch for receiving and outputting second color signals provided by said plurality of combining elements for a second picture element preceeding said first picture element; and a comparator connected to said first and second latches for comparing said first and second color signals to produce a result signal conditioned to indicate the result of said comparing.

5. The apparatus of claim 4, wherein said line tracking means includes:

a counter for counting picture elements in said picture element sequence and for providing a counting signal corresponding to a unique count value for each picture element in said picture element sequence;

a first FIFO connected to said first latch and to said comparator for storing said first color signals in response to a condition of said result signal indicating disparity between said first and second color signals; and a second FIFO connected to said counter and to said comparator for storing said counting signal in response to said condition of said result signal.

6. A method of tracking colors in a scanned image, comprising the steps of:

representing said scanned image by a scanning signal consisting of an ordered sequence of picture elements;

converting picture elements of said sequence into a plurality of color element signals, first and second of said color element signals representing, respectively, first and second intensity-free color elements, said color element signals each having a magnitude corresponding to a color element value;

representing predetermined colors by sets of color element values, each of said sets including respective magnitude ranges for said first and second intensity-free color elements;

for each converted picture element, comparing color element signal magnitudes with said sets of color element values;

if said color element signal magnitudes are within a color element value set, producing a first encoded pixel signal indicating the predetermined color represented by that color element value set, otherwise providing a second encoded pixel signal indicating that said pixel does not have a color represented by any of said color element value sets, said first and second encoded pixel signal having unequal signal values;

comparing encoded pixel signals for successive picture elements in said sequence; and in the event of disparity between encoded pixel signals for adjacent picture elements, FIFO-storing the encoded pixel signal for the picture element occurring most recently in said sequence together with a signal representing the location in said sequence of said picture element occurring most recently in said sequence.

7. The method of claim 6, wherein said step of producing includes producing a plurality of first encoded pixel signals, each having a unique signal value representing a respective one of said predetermined colors.

8. A method of tracking colors in a scanned image, comprising the steps of:

representing said scanned image by a scanning signal consisting of an ordered sequence of picture elements;

converting picture elements of said sequence into a plurality of color element signals, first and second of said color element signals representing, respectively, first and second intensity-free color elements, said color element signals each having a magnitude corresponding to a color element value;

representing predetermined colors by sets of color element values, each of said sets including respective magnitude ranges for said first and second intensity-free color elements;

for each converted picture element, comparing color element signal magnitudes with said sets of color element values;

if said color element signal magnitudes are within a set of color element values, producing an encoded pixel signal having a unique value corresponding to the predetermined color represented by said set of color element values;

comparing encoded pixel signals for successive picture elements in said sequence; and in the event of disparity between encoded pixel signals for adjacent picture elements, FIFO-storing the encoded pixel signal for the picture element occurring most recently in said sequence together with a signal representing the location in said sequence of said picture element occurring most recently in said sequence.

9. A system for identifying colored objects in a scanned image represented by a video signal, comprising:

a scan conversion apparatus for converting the video signal into a plurality of conversion signals, each of the conversion signals representing the magnitude of an intensity-free color element;

a recognition circuit connected to the scan conversion apparatus for detecting predetermined combinations of color element magnitudes in the conversion signals and for providing identifying signals which respectively identify the predetermined combinations;

the recognition circuit including, for each of the color elements, a color memory having an address port connected to the scan conversion apparatus for receiving a respective one of the conversion signals, a plurality of addressable multi-bit storage locations, a first storage location of the multi-bit storage locations having an address corresponding to the first magnitude of the represented intensity-free color element in a first combination of color element magnitudes, the first storage location containing information including a bit of predetermined significance which represents the first magnitude, and a data port for providing information; and a color difference detector connected to the recognition circuit and responsive to the identification signal for generating color change signals identifying a color change in the scanned image.

10. The system of claim 9 further including an image scan correlator connected to the recognition circuit and responsive to the video signal and a color identification signal for generating a color feature location signal which relates one of the predetermined combinations with a color feature location in the scanned image.

11. The system of claim 10 wherein the image scan correlator includes a frame mask store for storing mask representing color feature locations in the scanned image and providing a color location signal indicating a color location in the scanned image, the recognition circuit being connected to the frame mask store for providing an identifying signal in response to a color location signal, the identifying signal corresponding to occurrence of a predetermined combination of color elements at a color location in the scanned image.

12. The system of claim 9, wherein the recognition circuit further includes a combining circuit having a plurality of inputs, each of the inputs connected to a respective color memory data port to receive a bit having a predetermined significance and an output for providing the identifying signal.

13. The system of claim 9, further including encoding means connected to the color difference detector and responsive to the color change signal for producing an encoding signal indicating where in the scanned image the color change occurs.

* * * * *